United States Patent [19]

Durand et al.

[11] Patent Number: 4,900,997
[45] Date of Patent: Feb. 13, 1990

[54] DEVICE TO GUIDE AN OBJECT AROUND TWO AXES OF ROTATION

[75] Inventors: Patrick Durand, Maisons Alfort; Francois Viette, Creteil; Alain Riwan, Vanves, all of France

[73] Assignee: Commissariat a l'Energie Atomique, Paris, France

[21] Appl. No.: 247,031

[22] Filed: Sep. 20, 1988

[30] Foreign Application Priority Data

Sep. 21, 1987 [FR] France .................. 87 13037

[51] Int. Cl.$^4$ .................................. B25J 9/00
[52] U.S. Cl. .................. 318/568.21; 318/568.11; 901/15; 74/665 M; 414/735; 364/513
[58] Field of Search .................. 318/565–577; 364/513; 901/15, 26, 29; 74/665 A, 665 L, 665 M, 665 P, 640; 414/735, 738; 310/88

[56] References Cited

U.S. PATENT DOCUMENTS

| 3,739,923 | 6/1973 | Totsuka .................. 414/735 |
| 4,073,201 | 2/1978 | Taylor et al. .......... 74/665 L |
| 4,496,278 | 1/1985 | Kaise .................. 414/735 |
| 4,499,790 | 2/1985 | Helms .................. 414/735 X |
| 4,507,046 | 3/1985 | Sugimoto et al. ....... 414/735 |
| 4,512,710 | 4/1985 | Flatau .................. 414/735 |
| 4,527,945 | 7/1985 | Passemard et al. ...... 414/735 |
| 4,574,655 | 3/1986 | Kimura et al. ........ 901/15 X |
| 4,594,918 | 6/1986 | Kimura et al. ........ 901/15 X |
| 4,608,884 | 9/1986 | Beyer .................. 74/565 M X |
| 4,645,409 | 2/1987 | Gorman ............... 318/568.11 |
| 4,662,814 | 5/1987 | Suzuki et al. ........ 901/15 X |

FOREIGN PATENT DOCUMENTS 0178620 4/1986 European Pat. Off. .
2504051 10/1982 France .

Primary Examiner—William M. Shoop, Jr.
Assistant Examiner—Paul Ip
Attorney, Agent, or Firm—Michael N. Meller

[57] ABSTRACT

A device to guide an object (A) around two axes ($R_1$ and $R_2$).

A motor ($M_1$) controls rotation around an axis ($R_1$) by three gears (51, 70, 71); a further motor ($M_2$) controls the rotation of a fork joint (C) around another axis ($R_2$) by two other gears (26, 27). It simultaneously lets run the entire first motor ($M_1$). The gears are calculated so that the main shaft (72) of the object (A) moves around ($R_2$), but does not then revolve around ($R_1$).

3 Claims, 2 Drawing Sheets

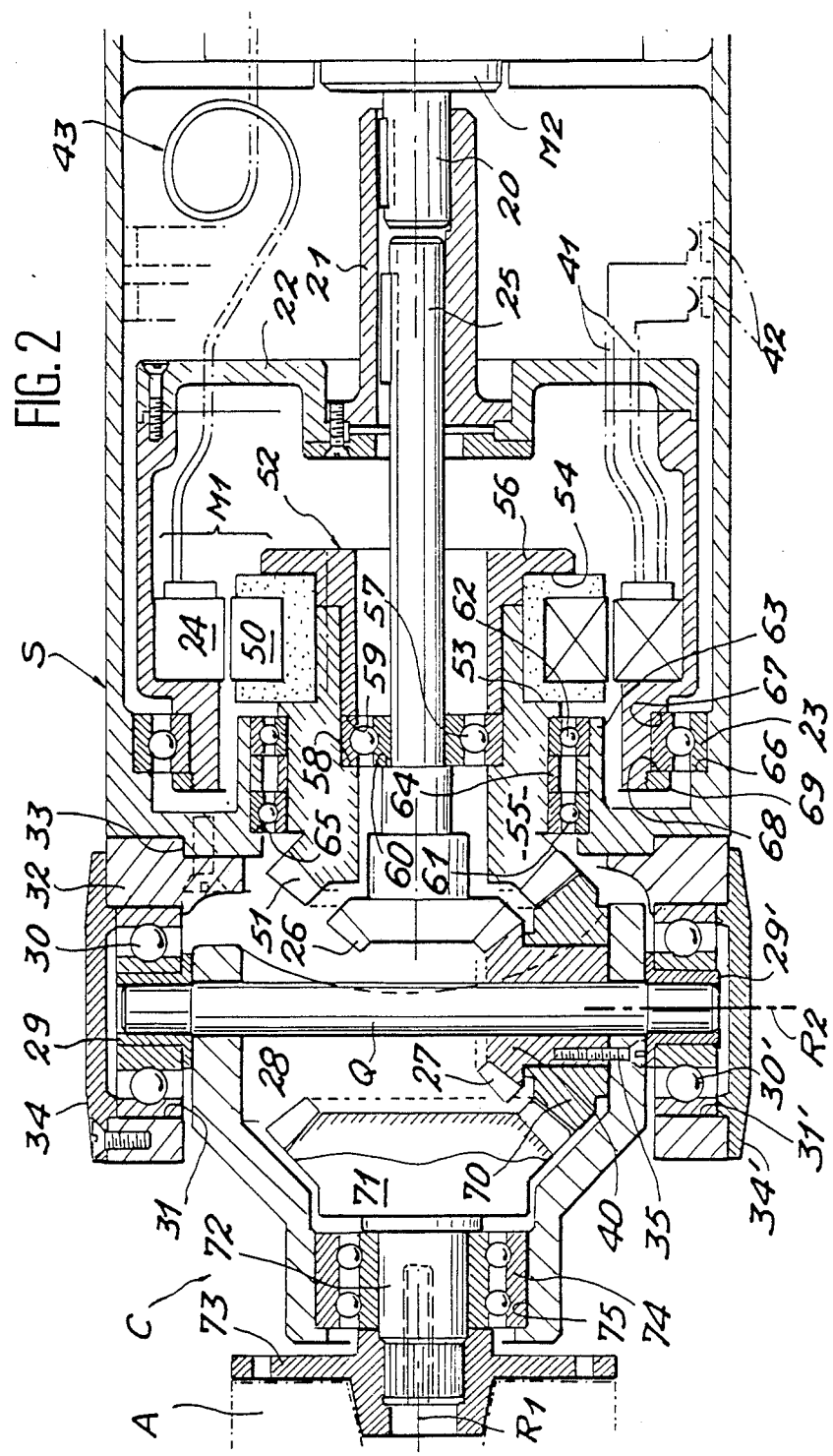

and the second toothed conical gear
wheel 7 due to the jutting out of the clamp 16. As the
first toothed conical gear wheel 6 remains immobile, the
second toothed conical gear wheel rotates: rotation
around the axis $R_2$ is accompanied by an undesired
rotation around the axis $R_1$ which is then necessary to
correct with the aid of the first motor $M_1$.

The uncoupling of the rotation movements is thus
only partial. This results in a serious complication of the
method for operating the robot, this being particularly
constricting in the case of production machines on an
assembly line where fast repetitive operations are required.

For a more detailed description of a device of this
type, reference should be made to the French patent
No. 2 504 051.

There are also devices where the motor $M_1$ is located
on the clamp C. The transmission composed of the
gears and wheels 5, 6 and 7 is eliminated. This conception makes it possible to uncouple the rotations, but
involves a greater heaviness in the fork joint which
impairs the speed and facility of its movements. Such
devices are described in the European patent No. 0 178
620 and the U.S. Pat. No. 4,073,201.

DEVICE TO GUIDE AN OBJECT AROUND TWO AXES OF ROTATION

FIELD OF THE INVENTION

This invention, brought about by the collaboration of
Messrs M. Riwan, P. Durand and F. Viette, relates to a
device to guide an object around two axes of rotation by
means of two motors which, without being coupled
together, each drive the object in rotation around one of
the axes.

In particular, it can be applied to a robot wrist joint.

BACKGROUND OF THE INVENTION

One of the drawbacks of previously known systems is
that they involve coupled movements, namely that
having the object located on the other side of the wrist
rotating around one axis involves an additional rotation
of the object around the other axis, the said drawback
being undesirable and one which thus needs to be corrected.

According to a known system represented on FIG. 1,
the object A can be guided around two axes $R_1$ and $R_2$
by means of two motors $M_1$ and $M_2$ introduced into a
support S, in fact the forearm of the robot.

The shafts of the two motors $M_1$ and $M_2$ are perpendicular to the axis $R_2$. The shaft of the first motor $M_1$
ends by a first conical gear wheel 5 engaged with a first
toothed conical gear wheel 6, itself engaged with a
second toothed conical gear wheel 7; the axis of rotation of the first toothed conical gear wheel 6 is merged
with the asis $R_2$. By means of this train of gears, a dual
90° angle transmission is obtained; the object A is secured to the extremity of a shaft 8 pivoting by rotating
the second toothed conical gear wheel 7 and which
materializes the axis of rotation $R_1$.

The shaft of the second motor $M_2$ ends by a second
gear 9, namely a spur gear, and which engages a pinion
10 in rotation around the shaft of the first motor $M_1$ and
linked to a third toothed conical gear wheel 11, itself
engaged with a fourth tooth conical gear wheel 12. A
90° angle transmission is thus obtained: the axis of rotation of the fourth toothed conical gear wheel 12, materialized by a shaft 14 turning inside a bearing 15 of the
support S and supporting the second conical gear wheel
16, is the axis $R_2$.

The fourth toothed conical gear wheel 12 and its
shaft 14 form an integral part of a fork joint C which in
addition includes a clamp 16 secured at one extremity to
said fourth wheel 12 and ends at its other extremity by
a pivot 17 inside the extension of the shaft 14 and turning (also around the axis $R_2$) inside a bearing 18 provided inside the support S. The shaft 8 to which the
object A is secured is supported by a bearing 13 provided inside the clamp 16.

The rotation of the object A around the axis $R_1$ occurs by a rotation of the motor $M_1$ which sets going the
transmission constituted by the conical gear wheel 5
and the first and second conical gear wheels 6 and 7.
The fork joint C thus remains immobile and, in this
instance, the uncoupling of movements effectively exists.

But when the motor $M_2$ is started, the rotation of the
fork joint C—and the object A—around the axis $R_2$,
produced by the setting going of the mechanical transmission composed of the spur gear 9, the toothed wheel
10 and the third and fourth toothed conical gear wheels
11 and 12, is accompanied by a translation of the object

SUMMARY OF THE INVENTION

The invention proposes a device which differently
disposes this twin-motor equipment and two transmissions so as to associate each motor to revolve around
only one of the axes $R_1$ and $R_2$ for rotating the object A.

According to the invention, the first motor $M_1$ is no
longer secured to the support S, but to the mechanical
transmission of the second motor $M_2$, so that starting of
the latter rotates the mechanical transmission which
precisely corrects at any given moment rotation of the
object around the axis $R_1$ generated by the rotation of
the fork joint C around the axis $R_2$.

More precisely, the invention relates to a device to
guide an object comprising a first motor composed of a
stator and a rotor linked by means of a first transmission
to a shaft pivoting around a first axis on a fork joint and
integral with the object, a second motor controlling the
rotation of the fork joint around a second axis by means
of a second transmission, wherein it includes a link
between the second motor and the stator allowing for
joint rotation of the stator and the rotor when the second motor is activated, and wherein the transmissions
are disposed so that pivoting of the shaft thus created
from the second motor by means of the first motor is
equal and with a direction opposite the one created by
displacement of the shaft on the first transmission following rotation of the fork joint under the effect of this
same action of the second motor by means of the second
transmission.

In one particular embodiment, the motors turn according to identical axes of rotation, which enables the
inertia of the device to be substantially reduced.

Where the transmissions consist of trains of gears, one
particular mode of embodiment is the one where the
trains each include two gears being in gear, the gears of
the first transmission being respectively linked to the
first motor and the axis of rotation of the fork joint, the
gears of the second transmission being respectively
linked to the rotor and revolving around the axis of
rotation of the fork joint, wherein the ratios of the numbers of teeth of the first and second gears are equal for
the two transmissions.

BRIEF DESCRIPTION OF THE DRAWINGS

There now follows a description of the invention with the aid of the annexed figures, listed below by way of illustration and in no way restrictive:

FIG. 2 shows one mode of embodiment of the invention, and

Figure 1:
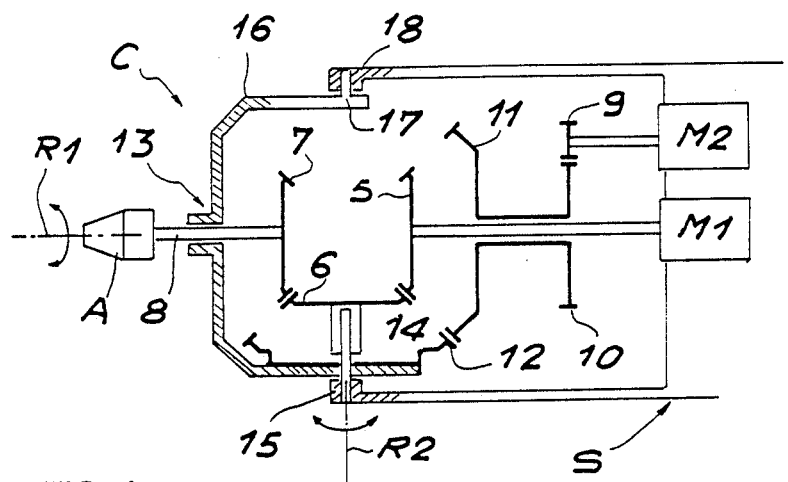
FIG. 1, already described, shows a diagram of an embodiment of the prior Art and illustrates its advantages.

The objects denoted by the letters on FIG. 1 also appear again with the same functions on FIG. 2.

The shaft 20 of the second motor $M_2$ with the aid of a key link drives in rotation a hollow sleeve 21 screwed to a generally cylindrical small barrel 22 and supported by the support S which encompasses it by means of a ball bearing 23. The small barrel 22 is equipped on its internal surface with the stator 24 of the motor $M_1$. The stator 24, which follows the small barrel 22 in rotation according to the invention, is fed by brushes 41 rubbing on circular conductors 42 disposed on the support S. Where one small angular clearance suffices, it is possible to use flexible electric wires 43 having a free length long enough to feed the stator 24.

An extension shaft 25, coaxial to the shaft 20 of the motor $M_2$, is integral with the motor by means of the small barrel 22 connected to it by a key. It carries a first conical gear 26 at its extremity distanced from the second motor $M_2$, which gears a second conical gear 27 so as to form a 90° angle transmission.

The second conical gear 27 is integral with a shaft 28 of the axis $R_2$ on which it is forcefully fastened. The shaft 28 is provided with two rings 29, 29' at its extremities whose outer surfaces are respectively supported on the internal rings of two ball bearings 30, 30'; their external rings are maintained inside two bearings 31, 31' bored into a part 32 in the shape of a crown which is screwed and centered on the support S by means of a circular centering device 33. The rolling bearings 30, 30' and thus the shaft 28 are translation maintained by means of two end plates 34, 34' screwed onto the crown 32 so as to wall in the bearings 31, 31'.

The fork joint C is screwed to the second conical gear 27 (by at least one screw 35) and thus moves in rotation with it around the axis $R_2$ driving the object A, as shall be described subsequently.

The rotor 50 of the first motor $M_1$ is concentric and incident to the stator 24. It is supported by the shaft 52 of a third conical gear 51 on which it is centered; it is maintained in the axial direction between two shoulders 53 and 54 embodied on two parts 55 and 56 of the shaft 52 which are assembled by screwing; the first part 55 carries the third conical gear 51 and the second part 56 is a stop.

The third conical gear 51 has the same axis of rotation as the first conical gear 26 and their respective shafts 52 and 25 are centered by means of a ball bearing 57 whose external and internal rings are respectively in contact with these two shafts, the external ring being axially blocked between two shoulders 58 and 59 of the two parts 55 and 56 and the internal ring coming to stop against a shoulder 60 of the shaft 25 on which it is tightly mounted.

Two other ball bearings 61 and 62 are disposed between the first part 55 of the shaft 52 of the third conical gear 51 and the internal surface of a cylindrical bearing 63 inside the support S; their spacing is adjusted by a distance sleeve 64 provided on the first part 55 of the shaft 52 and their axial position by means of a stop 65 of the bearing 63. The rings of the roller bearings 61 and 62 are tightly mounted.

This construction means that the axial positioning of the first and third conical gears 26 and 51, as well as the positioning of the rotor 50, are perfectly defined and are foolproof. The axial positioning of the stator 24 is guaranteed by the roller bearing 23 and the shaft 20 of the motor $M_2$ provided with roller bearings (not shown on the figure) whose external ring is tightly mounted in the support S and forms a stop against a shoulder 66 of the support when its internal ring is wedged between two shoulders 67 and 68 respectively belonging to the small barrel 22 and a nut 69 which is screwed onto the latter.

It will be observed that, although the first and third conical gears 26 and 51 are coaxial and contiguous in order to limit the spatial requirement of the device, they are not in contact and their rotations are independent.

The third conical gear 51 gears a fourth conical gear 70 of the axis of rotation $R_2$ which is loosely mounted around a shaft 40 extending the second conical gear 27 and is axially maintained, with a slight gap, between the said second conical gear 27 and the fork joint C. Smooth bearings, now shown here, can be provided so as to ensure slight friction or rubbing.

The fourth conical gear 70 gears a fifth conical gear 71 forming a 90° angle transmission: the axis of rotation of the fifth conical gear 71, materialized by a shaft 72, is $R_1$. The object A is secured to a plate 73 integral with the shaft 72. A roller bearing with a double set of balls 74 is introduced between the shaft 72 and a bore 75 of the fork joint C.

It merely remains to describe the functioning of the device.

In order to orientate the object A around the axis $R_1$, the first motor $M_1$ is started up: the stator 24 remains immobile and the rotor 50 turns succesively driving in rotation the third, fourth and fifth conical gears 51, 70 and 71 and the plate 73. The rest of the device, and in particular the fork joint C, remain immobile. Uncoupling is thus effected.

In order to orientate the object A around the axis $R_2$, the second motor $M_2$ is started up and thus drives the first and second conical gears 26 and 27, the fork joint C and finally the object A. It also drives in rotation the small barrel 22 and the stator 24 of the first motor $M_1$.

Magnetic coupling between the stator 24 and the rotor 50 means that they shall revolve jointly without any relative movement: the third, fourth and fifth conical gears, 51, 70 and 71 are also thus driven.

Let us denote by d the number of teeth of a gear, its angle of rotation by $\theta$ with a mutual positive direction (for example, the trigonometrical direction seen by an observer situated at the point Q common to all the axes of rotation of the gears).

If the first gear 26 turns with an angle $+\theta 26$, the second gear 27 and the fork joint C turn with an angle of $\theta 27 = -\theta 26 \, (d26/d27)$. If the fourth gear 70 were immobile, the fifth gear 71 would be subjected to a rotation of $\theta 71 = (d70/d71)\theta 27$.

But the third gear 51 is led in rotation with an angle of $\theta 51 = \theta 26$, and it can be inferred that a rotation of the fourth gear 70 appears, as well as a further rotation of the fifth gear 71, which are of angles equal to $\theta 70 = -(d51/d70)\theta 51$ and $\theta'71 = -(d70/d71)\theta 70$ respectively.

One wants to embody $\theta 71 + \theta'71 = 0$. It is immediate that this condition is equivalent, in the mode of embodiment described, to $d51/d70 = d26/d27$, namely that the toothing ratios firstly between the first and second gears 26 and 27 secondly between the third and fourth gears 51 and 70 are the same. The teeth number of the fifth gear 71 is immaterial.

This condition makes it possible to carry out perfect uncoupling: the second motor $M_2$ now only controls rotation of the object A around the axis $R_2$.

Figure 3:
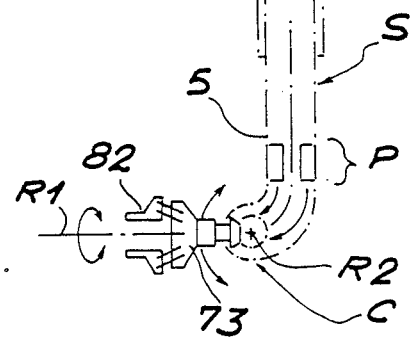
FIG. 3 shows one possible application of the invention.

FIG. 3 shows an envisaged application, but one which is not exclusive. A robot 80 is provided with a turning arm 81 ended by the support S. The device described in the text of this patent constitutes what one could call the wrist P of the robot 80. The orientated object A is a tool, such as a clamp 82.

Experts in this field could clearly provide many improvements to the described embodiment, especially as regards the disposition and constitution of movement transmission chains without departing from the context of the invention. However, it would be preferable to place the first motor $M_1$ coaxially to the second motor $M_2$ so as to limit the rotary inertia of the device.

What is claimed is:

1. A device to guide an object comprising a first motor composed of a stator and a rotor linked by means of a first transmission to a shaft pivoting around a first axis on a fork joint and integral with the object, a second motor having an output shaft controlling said fork joint in rotation around a second axis by means of a second transmission, wherein the output shaft of said second motor is rigidly linked to said stator of said first motor allowing for the joint rotation of said stator and said rotor of said first motor when the second motor is activated, and wherein the transmissions are disposed so that the pivoting of the shaft thus created from the second motor by means of the first motor is equal with an opposite direction to the pivoting of said shaft created by the displacement of the shaft on the first transmission due to the rotation of the fork joint under the effect of the same action of the second motor by means of the second transmission, both said motors turning about the same axis of rotation.

2. A device to guide an object as claimed in claim 1, wherein the transmissions are trains of gears.

3. A device to guide an object as claimed in claim 2, wherein the transmissions each comprise two gears in gear, the gears of the first transmission being respectively linked to the first motor and the axis of rotation of the fork joint, the gears of the second transmission being respectively linked to the rotor and revolving around the axis of rotation of the fork joint, wherein the ratios of the numbers of teeth of the first and second gears are equal for the two transmissions.

* * * * *